No. 735,334. PATENTED AUG. 4, 1903.
W. BAUSCH.
EYEGLASSES.
APPLICATION FILED APR. 20, 1899.
NO MODEL.
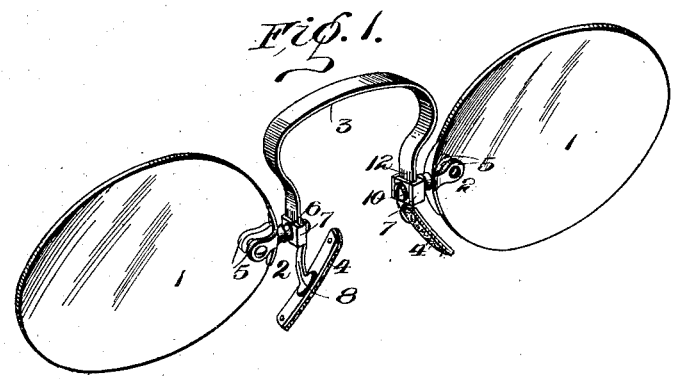
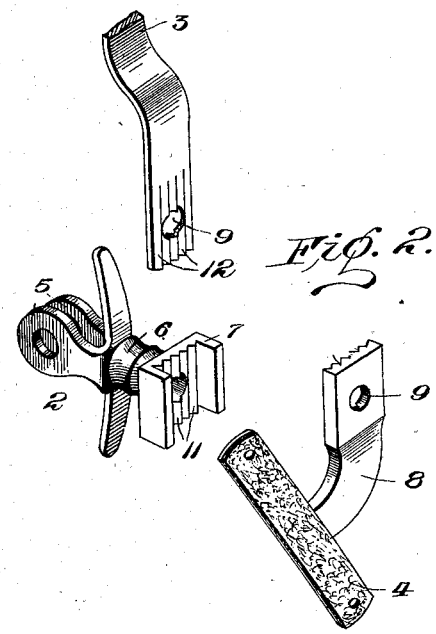
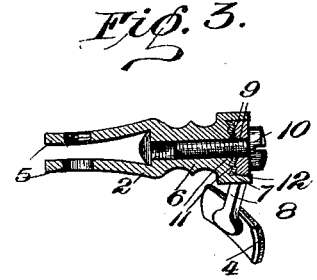
Witnesses.
Walter B. Payne.
G. Willard Rich.
Inventor.
William Bausch
by Church & Church
his Attorneys No. 735,334.

Patented August 4, 1903.

UNITED STATES PATENT OFFICE.

WILLIAM BAUSCH, OF ROCHESTER, NEW YORK, ASSIGNOR TO THE BAUSCH & LOMB OPTICAL COMPANY, OF ROCHESTER, NEW YORK, A CORPORATION OF NEW YORK.

EYEGLASSES.

SPECIFICATION forming part of Letters Patent No. 735,334, dated August 4, 1903.

Application filed April 20, 1899. Serial No. 713,777. (No model.)

*To all whom it may concern:*

Be it known that I, WILLIAM BAUSCH, of Rochester, in the county of Monroe and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to eyeglasses, and has for its object to improve the construction of the parts whereby the nose-guards and spring may be firmly secured to the lens-clips without the liability of any lateral movement between them which would cause their connection to become loosened.

To this end my invention consists in certain improvements hereinafter described, the novel features being pointed out in the claims at the end of this specification.

In the drawings, Figure 1 is a perspective view showing the frame of a pair of eyeglasses; Fig. 2, a similar view showing a clip and the parts detached; Fig. 3, a horizontal sectional view through one of the clips.

Similar reference-numerals in the figures indicate similar parts.

In the present instance I have shown my invention in connection with rimless eyeglasses, embodying the lenses 1, the securing-clips 2, the bow-spring or bridge 3, and the offset nose-guards 4. The clip 2 may be of the usual or any preferred construction, having the ears 5, adapted to engage the lens on opposite sides and provided with the base or post 6 and grooved to form the ears or lugs 7, extending on the side thereof. The ends of the spring and the shank 8 of the nose-guards are provided with apertures 9 and adapted to be secured in the groove in the base of the clip between the ears 7 by means of a single screw 10 screwing into the clip. Owing to the fact that the parts secured by the screws are small and the difficulty of obtaining an accurate fit between the sides of the groove 7 and the parts inclosed thereby, it is impossible to absolutely prevent all relative lateral movement, because of the frequent handling to which eyeglasses are subjected, and any slight movement between these parts loosens the binding-screw, causing inconvenience and annoyance to the wearer.

In my improved construction I have provided the base of the clip between the ears 7 with alternate ridges and depressions by milling or otherwise forming serrations therein, as shown at 11. Similar serrations are also provided upon both sides of the ears 12 of the spring or bridge and upon the inner side of the shanks 8 of the nose-pieces. The notches and depressions on the various pieces are adapted to interlock when the parts are positioned and be secured by the binding-screw 10, the overlapping of the projections on the engaging surfaces preventing any movement between either the clip and the bow-spring or between the latter and the nose-piece, all as shown in Fig. 3. I prefer to use a form of serrations similar to that shown in which there are at least two points or raised portions or projections arranged far enough apart to form a substantial base or support and preferably one located upon each side of the screw-aperture which lie in the same plane, as this arrangement enables the clip and nose-piece to be used interchangeably with the serrated spring or with a spring of the usual construction having a plain end if necessity arises for repairs when the improved spring is not at hand. By reason of this interchangeability any two of the parts may be used, or all of them, or only one of them, with other cooperating parts having flat or plain surfaces.

I claim as my invention—

1. In an eyeglass-mounting, the combination of the bridge and the guard members, each having their end portions provided with a rib and fitting one into the other, the frame member provided with a seat forming the counterpart of said ribs, into which the latter are fitted, and a screw passing through and rigidly securing the said parts together, substantially as described.

2. In an eyeglass-mounting the combination of the frame member and the clamping-screw with the bridge and the nose-guard, the said bridge and nose-guard being interlocked with each other by means of the recessed bearing-face of the one and the projecting bearing-face of the other, said bearing-faces being held together by means of a clamping-screw which passes into the frame member through the recessed and projecting bearing-faces of the said bridge and nose-guard, substantially as described.

3. In an eyeglass-mounting the combination of the bridge and the nose-guard, interlocked with each other by means of the recessed bearing-face of the one and the projecting bearing-face of the other, with the frame member also provided with a bearing-face interlocked with the bearing-face of the adjacent member and the clamping-screw passing into the frame member through the interlocked bearing-faces of the bridge, nose-guard and frame member and holding the said bearing-faces together, substantially as described.

4. In an eyeglass-mounting the combination of the guard and the bridge, having the end portions thereof provided with convex portions cross-sectionally and fitting one into the other, the frame member provided with a recess into which the said guard and bridge are mounted and a securing-screw for fastening the several members together, substantially as described.

WILLIAM BAUSCH.

Witnesses:
F. F. CHURCH,
G. A. RODA.